(12) United States Patent
Ohbayashi et al.

(10) Patent No.: US 8,853,905 B2
(45) Date of Patent: Oct. 7, 2014

(54) RADIAL DIRECTION CONTROLLER AND MAGNETIC BEARING APPARATUS UTILIZING SAME

(71) Applicant: Osaka Vacuum, Ltd., Osaka (JP)

(72) Inventors: Tetsuro Ohbayashi, Osaka (JP); Mitsunori Watanabe, Osaka (JP)

(73) Assignee: Osaka Vacuum, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 14/235,974

(22) PCT Filed: Dec. 27, 2012

(86) PCT No.: PCT/JP2012/083991
§ 371 (c)(1),
(2), (4) Date: Jan. 29, 2014

(87) PCT Pub. No.: WO2013/100104
PCT Pub. Date: Jul. 4, 2013

(65) Prior Publication Data
US 2014/0159526 A1 Jun. 12, 2014

(30) Foreign Application Priority Data
Dec. 29, 2011 (JP) ................................. 2011-290417

(51) Int. Cl.
*H02K 7/06* (2006.01)
*F16C 32/04* (2006.01)
(52) U.S. Cl.
CPC ......... *F16C 32/0451* (2013.01); *F16C 32/0453* (2013.01); *F16C 32/0446* (2013.01); *F16C 32/048* (2013.01)
USPC .......................................... 310/90.5; 361/139
(58) Field of Classification Search
CPC ............. F16C 32/0444; F16C 32/0446; F16C 32/0451; F16C 32/0489
USPC .................................. 310/90.5; 361/139, 143
See application file for complete search history.

(56) References Cited

U.S. PATENT DOCUMENTS 5,256,952 A * 10/1993 Yoneyama et al. ........... 318/629
5,736,800 A *  4/1998 Iannello et al. .............. 310/90.5
(Continued)

FOREIGN PATENT DOCUMENTS

| JP | 63-303217 A | 12/1988 |
| JP | 06-213233 A | 8/1994 |
| JP | 2009-063005 A | 3/2009 |

OTHER PUBLICATIONS

International Search Report—Date of Mailing Jan. 29, 2013.

*Primary Examiner* — John K Kim
*Assistant Examiner* — David Scheuermann
(74) *Attorney, Agent, or Firm* — Howard & Howard Attorneys PLLC (57) ABSTRACT

Provided is a radial direction controller capable of handling changes in negative bearing stiffness according to the mounting orientation. This radial direction controller, which is a magnetic bearing device that lifts and supports a rotating body by electromagnets, is equipped with: a radial control circuit for controlling displacement of the axis of the rotating body in the radial direction; a negative bearing stiffness elimination circuit that is connected in parallel with the radial control circuit and outputs a signal about the negative bearing stiffness; converters that output current values for controlling the electromagnets, based on the output signals from these circuits; filters that extract the DC component from the current values; computing units that compute correction coefficients based on the extracted DC components and the bias current of the electromagnets; and multiplication units that multiply the computed correction coefficients with the signal output from the negative bearing stiffness elimination circuit.

24 Claims, 8 Drawing Sheets

(56) References Cited

U.S. PATENT DOCUMENTS

| | | | | |
|---|---|---|---|---|
| 5,923,559 A * | 7/1999 | Yamamoto | | 700/170 |
| 6,005,315 A * | 12/1999 | Chapman | | 310/90.5 |
| 6,107,770 A * | 8/2000 | Jackson et al. | | 318/611 |
| 6,201,329 B1 * | 3/2001 | Chen | | 310/90.5 |
| 6,267,876 B1 * | 7/2001 | Allaire et al. | | 310/90.5 |
| 6,653,756 B2 * | 11/2003 | Ueyama et al. | | 310/90.5 |
| 6,657,345 B2 * | 12/2003 | Shinozaki | | 310/90.5 |
| 6,787,955 B1 * | 9/2004 | Ueyama | | 310/90.5 |
| 7,038,429 B2 * | 5/2006 | Browning et al. | | 322/49 |
| 7,737,590 B2 * | 6/2010 | Oyama | | 310/90.5 |
| 2002/0011754 A1 * | 1/2002 | Shinozaki | | 310/90.5 |
| 2003/0201684 A1 * | 10/2003 | Browning et al. | | 310/90.5 |

* cited by examiner

RADIAL DIRECTION CONTROLLER AND MAGNETIC BEARING APPARATUS UTILIZING SAME

CROSS REFERENCE TO RELATED APPLICATION

This application is a national stage application of PCT/JP2012/083991, filed Dec. 27, 2012, which claims priority to Japanese Patent Application No. 2011-290417, filed Dec. 29, 2011, the disclosures of which are hereby incorporated by reference in their entirety.

TECHNICAL FIELD

The present invention relates to a radial direction controller that is applied to a magnetic bearing apparatus for supporting a rotating body, and to that magnetic bearing apparatus.

BACKGROUND ART

A radial direction controller is per se known that is applied to a magnetic bearing apparatus that supports a rotating body by the operation of opposing electromagnets so that the rotating body levitates. And such a radial direction controller is per se known that is provided with a negative bearing stiffness elimination circuit for eliminating negative bearing stiffness, which is negative position stiffness with increasing of the attractive force according to the amount that an electromagnet and the rotating body approach one another (for example, refer to Patent Document #1).

Patent Literature—Patent Document #1: Japanese Laid-Open Patent Publication No. 2009 63005.

SUMMARY OF INVENTION

Technical Problem

The radial direction controller of Patent Document #1 is effective in cases in which the steady load upon the radial electromagnets remains constant and the negative bearing stiffness of the radial electromagnets is constant, such as a case in which the attitude of an object such as the rotor of a large size electrical power generation turbine is fixed (so that its shaft remains horizontal), or the like. However, generally negative bearing stiffness changes according to the state of the steady load upon the electromagnets. And, depending upon the user, there are various attitudes in which a compact device such as a turbo-molecular pump may be mounted. Due to this, according to the mounting attitude, sometimes such a pump is mounted so that its shaft becomes horizontal, and sometimes it is mounted so that its shaft becomes vertical. And different negative bearing stiffness is generated according to the mounting attitude, since the steady load upon the electromagnets is different depending upon the mounting attitude. Due to this, with a radial direction controller like that of Patent Document #1, it is necessary for a negative bearing stiffness elimination circuit for eliminating the influence of negative bearing stiffness to be set according to the mounting attitude.

Thus, the object of the present invention is to provide a radial direction controller, and a magnetic bearing apparatus to which such a controller is applied, that are capable of dealing with change in negative bearing stiffness corresponding to the mounting attitude.

Solution to Problem

The first radial direction controller of the present invention is applied to a magnetic bearing apparatus that supports a rotating body to be levitated by at least an electromagnet, and comprises: a radial control circuit that controls the displacement of the axis of the rotating body in the radial direction; a negative bearing stiffness elimination circuit that is connected in parallel with the radial control circuit, and that outputs a signal related to negative bearing stiffness; a current value command device that outputs a current value for controlling the electromagnet, on the basis of a signal outputted by the radial control circuit and the signal related to the negative bearing stiffness outputted by the negative bearing stiffness elimination circuit; a DC component extraction device that extracts a DC component from the current value outputted by the current value command device; a correction coefficient calculation device that calculates a correction coefficient on the basis of the DC component extracted by the DC component extraction device and a bias current for the electromagnet; and a coefficient multiplication device that multiplies the signal outputted by the negative bearing stiffness elimination circuit by the correction coefficient calculated by the correction coefficient calculation device.

According to the first radial direction controller of the present invention, the correction coefficient that corresponds to the DC component is multiplied into the signal related to negative bearing stiffness, and the current value for controlling the electromagnet is outputted by utilizing the result of this multiplication. In other words, change of the DC component is reflected in the current value that is outputted. Since the DC component of the current value outputted by the radial control circuit changes due to change of the negative bearing stiffness, accordingly it is possible to reflect the change of the negative bearing stiffness to the current value for controlling the electromagnet. Since, due to this, it is possible to control the electromagnet according to change of the negative bearing stiffness, accordingly it is possible to support the rotating body while dealing with change of the negative bearing stiffness corresponding to various different types of mounting attitude. Because of this, it is possible to suppress instabilities of levitation control and so on occurring in cases, such as a case in which a controller corresponding to attitudes in which the axis of the rotating body becomes horizontal or vertical is mounted at opposite attitude.

In one aspect of the first radial direction controller of the present invention, the correction coefficient calculation device may calculate the correction coefficient by using the following formula, where $i_{dc}$ represents the DC component, $I_0$ represents the bias current, and C represents the correction coefficient. In this case, it is possible to calculate a more suitable correction coefficient.

$$C = \begin{cases} 1 + \left(\dfrac{|i_{dc}|}{I_0}\right)^2 & \text{if } i_{dc} \leq I_0, \\ 1 + \dfrac{|i_{dc}|}{I_0} & \text{if } i_{dc} > I_0. \end{cases} \quad \text{[Formula 1]}$$

The correction coefficient may be used in multiplication in any appropriate way. For example, in one aspect of the first radial direction controller of the present invention, there may be further included a storage apparatus that stores the correction coefficient calculated by the correction coefficient calculation device; and wherein the coefficient multiplication device performs the multiplication using the correction coefficient stored by the storage device. Moreover, in this aspect, the storage device may store an initial value of the correction coefficient; and the coefficient multiplication device, in the multiplication, may use the initial value stored by the storage device at starting time of the levitation of the rotating body, and use the correction coefficient calculated by the correction coefficient calculation device after a predetermined time period has elapsed from the starting time of the levitation of the rotating body. In this case, it is possible to postpone reflection of the change of negative bearing stiffness in the control of the electromagnet until the predetermined time period has elapsed. Due to this, for example, it is possible to eliminate unstable variation of starting time of levitation.

Moreover, in this aspect in which the coefficient multiplication device utilizes the correction coefficient stored in the storage device from after a predetermined time period has elapsed, there may be further provided a permission device that controls permission or non-permission of at least one of the extraction performed by the DC component extraction device, and the calculation performed by the correction coefficient calculation device, and wherein: the permission device may control the extraction performed by the DC component extraction device and the calculation performed by the correction coefficient calculation device to be not permitted from the starting time of the levitation of the rotating body until a predetermined time period has elapsed, and to be permitted after the predetermined time period has elapsed; and the coefficient multiplication device, after the extraction performed by the DC component extraction device and the calculation performed by the correction coefficient calculation device have been permitted by the permission device, may implement utilization of the correction coefficient calculated by the correction coefficient calculation device after the predetermined time period has elapsed from the starting time of the levitation of the rotating body by using the correction coefficient calculated by the correction coefficient calculation device and stored by the storage device.

And the second radial direction controller of the present invention is applied to a magnetic bearing apparatus that supports a rotating body to be levitated by at least an electromagnet, and comprises: a radial control circuit that controls the displacement of the axis of the rotating body in the radial direction; a negative bearing stiffness elimination circuit that is connected in parallel with the radial control circuit, and that outputs a signal related to negative bearing stiffness; a current value command device that outputs a current value for controlling the electromagnet, on the basis of a signal outputted by the radial control circuit and the signal related to the negative bearing stiffness outputted by the negative bearing stiffness elimination circuit; a correction coefficient storage device that stores a plurality of correction coefficients, each corresponding to an installation attitude of the axis of the rotating body; a coefficient distinguishing device that appends information to a specified correction coefficient among the plurality of correction coefficients each corresponding to an installation attitude of the axis of the rotating body, for distinguishing the specified correction coefficient from other correction coefficients; a specified coefficient storage device that stores the specified correction coefficient; and a coefficient multiplication device that multiplies the signal outputted by the negative bearing stiffness elimination circuit by the specified correction coefficient stored by the specified coefficient storage device.

According to this second radial direction controller of the present invention, change of the negative bearing stiffness corresponding to change of the installation attitude is reflected by utilizing the plurality of correction coefficients that are stored in advance in the coefficient storage device. Since the plurality of correction coefficients correspond to various installation attitudes, accordingly it is possible to correct the change of negative bearing stiffness corresponding to the installation attitude by causing the appropriate correction coefficient corresponding to the installation attitude to be used by the coefficient multiplication device. By doing this, if for example the possible candidate installation attitude is limited, by using the correction coefficient that corresponding to this limited attitude, it is possible to reflect the change of negative bearing stiffness in a more appropriate manner.

In one aspect of the second radial direction controller of the present invention, there may be further included: a DC component extraction device that extracts a DC component from the current value outputted by the current value command device; a component reference value storage device that stores reference values of a plurality of DC components each corresponding to an installation attitude of the axis of the rotating body; a reference value distinguishing device that appends information to a specified reference value among the plurality of reference values, for distinguishing the specified reference value from other reference values; a specified reference value storage device that stores the specified reference value; and a comparison device that compares together the DC component extracted by the DC component extraction device and the specified reference value stored by the specified reference value storage device, and that, if a predetermined condition is satisfied, outputs a control signal so that rotation of the rotating body is not started. In this case, furthermore, if the predetermined condition is satisfied, by taking advantage of the reference value, the control signal is outputted so that the rotation of the rotating body is not started. Due to this, it is possible to prevent the rotation of the rotating body from being started if a DC component has been outputted that is inappropriate with respect to the reference value. And due to this, if for example the correction coefficient which is to be used as the subject for multiplication is one that is not appropriate according to the installation attitude, then it is possible to prevent the rotation of the rotating body from being started.

In one aspect of the second radial direction controller of the present invention, the comparison device may output the control signal as the predetermined condition having been satisfied, if the result that the DC component extracted by the DC component extraction device is greater than the specified reference value is included in the result of comparison together of the DC component extracted by the DC component extraction device and the specified reference value. In this case, it is possible to prevent the rotation of the rotating body from starting if an inappropriate DC component is outputted in a more reliable manner.

In the first radial direction controller and the second radial direction controller of the present invention, any suitable devices may be used as the DC component extraction device. For example, in the above first aspect of the radial direction controller of the present invention and in the above second aspect of the radial direction controller of the present invention, a low pass filter whose cutoff frequency is 1 Hz or less may be used as the DC component extraction device.

And the magnetic bearing apparatus of the present invention comprises the radial direction controller as described above. In this case, it is possible to implement a magnetic bearing apparatus that is capable of dealing with change of negative bearing stiffness according to its mounting attitude.

Advantageous Effects of Invention

As has been explained above, according to the present invention, change of the DC component is reflected in the current value that is outputted. Since the DC component of the current value that is outputted by the radial control circuit changes according to change of the negative bearing stiffness, accordingly it is possible to reflect the change of the negative bearing stiffness in the current value for controlling the electromagnet. Since, due to this, it is possible to control the electromagnet according to change of the negative bearing stiffness, accordingly it is possible to support the rotating body while taking account of changes of the negative bearing stiffness that correspond to various types of mounting attitude.

DESCRIPTION OF EMBODIMENTS

Figure 1:
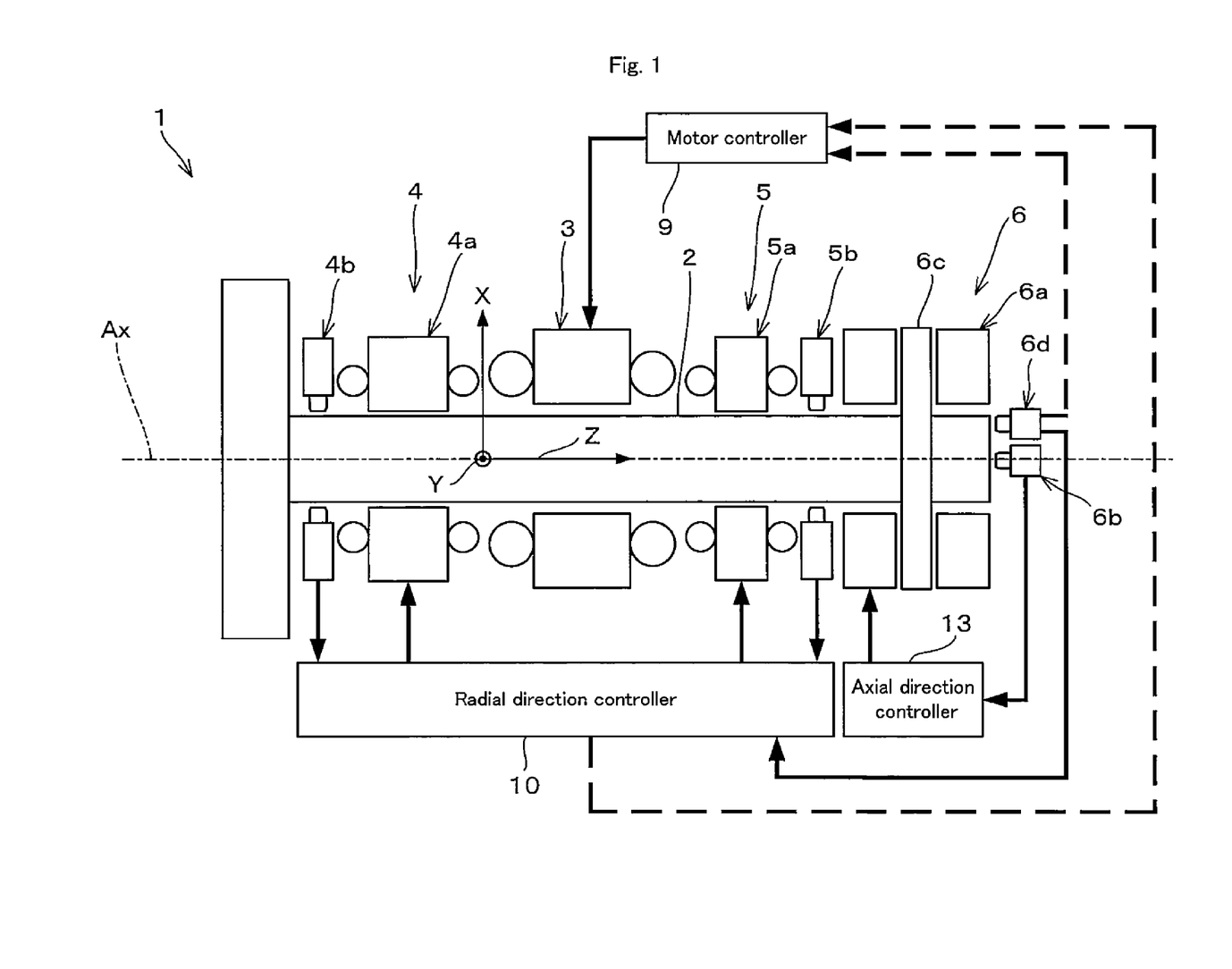
FIG. 1 is a schematic figure showing the main portion of a magnetic bearing apparatus according to an embodiment of the present invention.

In the following, magnetic bearing apparatuses according to embodiments of the present invention will be explained with reference to the drawings. FIG. 1 is a schematic figure showing the main portion of a magnetic bearing apparatus 1 according to an embodiment of the present invention. As shown in FIG. 1, this magnetic bearing apparatus 1 comprises a rotating body 2 that rotates about an axis Ax, a motor 3 that rotationally drives the rotating body 2, a first radial magnetic bearing 4 that supports one end of the rotating body 2 and a second radial magnetic bearing 5 that supports its other end, and an axial magnetic bearing 6 that supports the rotating body 2 in the axial direction. Moreover, in FIG. 1, the direction parallel to the axis Ax is termed the Z-axis, one direction that is orthogonal to the axis Ax so as to intersect it perpendicularly is termed the X-axis, and the direction that is orthogonal to this Z-axis and X-axis is termed the Y-axis.

The first radial magnetic bearing 4 comprises first electromagnets 4a that are arranged in positions to oppose one another with the rotating body 2 between them, and first radial position sensors 4b that detect displacements of the rotating body 2 with respect to directions radial to the axis Ax. Moreover, in a similar manner, the second radial magnetic bearing 5 comprises second electromagnets 5a that are arranged in positions to oppose one another with the rotating body 2 between them, and a number of second radial position sensors 5b that detect displacements of the rotating body 2 with respect to directions radial to the axis Ax. Both of the radial magnetic bearings 4 and 5 are connected to a radial direction controller 10. On the basis of the displacements of the axis Ax detected by the radial position sensors 4b and 5b, the radial direction controller 10 controls the values of the currents supplied to the electromagnets 4a and 5a so that the electromagnets 4a and 5a levitates the rotating body 2 at a predetermined position in the radial direction.

The axial magnetic bearing 6 comprises a rotor disk 6 that is provided coaxially with the rotating body 2, electromagnets 6a that are arranged in positions to oppose one another with the rotor disk 6c between them, and an axial position detection sensor 6b that detects the displacement of the rotating body 2 in the axial direction. Moreover, this axial magnetic bearing 6 is connected to an axial direction controller 13. The axial direction controller 13 controls the currents supplied to the electromagnets 6a on the basis of displacement of the position of the rotating body 2 detected by the axial position detection sensor 6b, so as to make the electromagnets 6a keep the position of the rotating body 2 in its axial direction at a predetermined position.

The motor 3 is connected to a motor controller 9, and its operation is controlled by the motor controller 9. Various types of sensor may be connected to the motor controller 9, such as, for example, a rotation detection sensor 6d that is capable of detecting the rotational speed of the rotating body 2, and so on. Or various types of controller such as the radial direction controller 10 and so on may also be connected to the motor controller 9. And the motor controller 9 controls the operation of the motor 3 by referring to the results of detection by these various sensors, or to the results of control by the controller.

Next, the structures of radial direction controllers 10 according to various embodiments of the present invention will be described, for each embodiment.

A First Embodiment of the Radial Direction Controller

Figure 2:
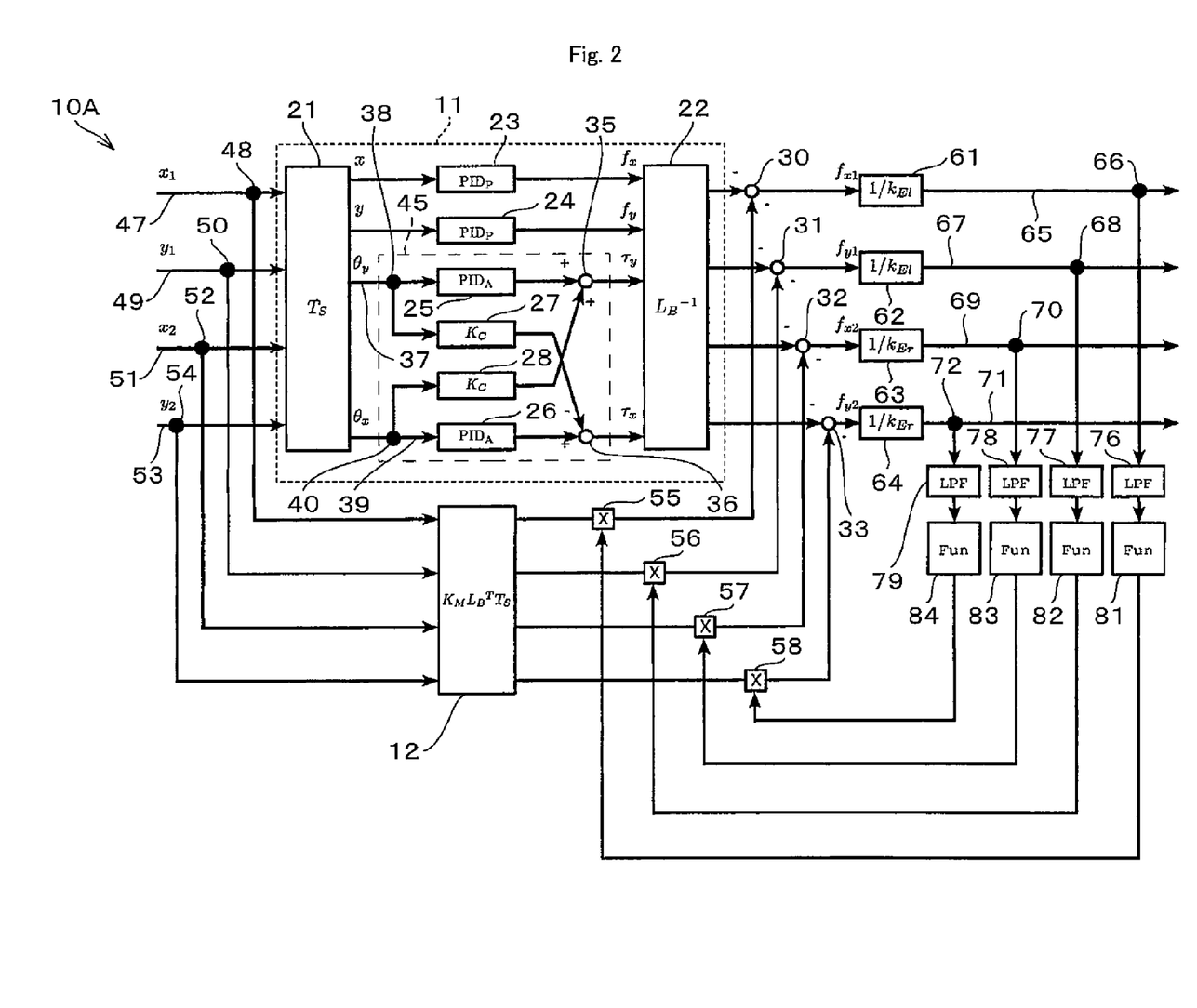
FIG. 2 is a figure showing an example of a block diagram of a signal system of a radial direction controller according to a first embodiment.

FIG. 2 is a figure showing an example of a block diagram of a signal system of a radial direction controller 10A according to a first embodiment. As shown in FIG. 2, a radial control circuit 11 and a negative bearing stiffness elimination circuit 12 that is connected in parallel with this radial control circuit 11 are provided to this radial direction controller 10A according to the first embodiment. And the radial control circuit 11 comprises a first signal converter 21, a second signal converter 22, a first translatory motion controller 23, a second translatory motion controller 24, a first angular motion controller 25, a second angular motion controller 26, a first cross signal converter 27, and a second cross signal converter 28.

Moreover, the following are the meanings of certain symbols in FIG. 2:

x1: X-axis direction displacement of the rotating body 2 detected by the first radial position sensors 4b y1: Y-axis direction displacement of the rotating body 2 detected by the first radial position sensors 4b x2: X-axis direction displacement of the rotating body 2 detected by the second radial position sensors 5b y2: Y-axis direction displacement of the rotating body 2 detected by the second radial position sensors 5b x: X-axis direction displacement of the barycenter of the rotating body 2 y: Y-axis direction displacement of the barycenter of the rotating body 2

θy: inclination angle of the rotating body 2 around the Y-axis

θx: inclination angle of the rotating body 2 around the X-axis fx: X-axis direction force acting upon the rotating body 2 fy: Y-axis direction force acting upon the rotating body 2

τy: torque around the Y-axis acting upon the rotating body 2

τx: torque around the X-axis acting upon the rotating body 2 fx1: X-axis direction force of the first electromagnets 4a fy1: Y-axis direction force of the first electromagnets 4a fx2: X-axis direction force of the second electromagnets 5a fy2: Y-axis direction force of the second electromagnets 5a Incidentally, it should be understood that the X-axis, the Y-axis, and the Z-axis correspond to the X-axis, the Y-axis, and the Z-axis of FIG. 1.

As shown in FIG. 2, the signals x1, y1, x2, and y2 are inputted to the first signal converter 21. The first signal converter 21 performs Ts signal conversion upon the inputted signals, and outputs the signals x, y, θy, and θx. Here, the inverse matrix of Ts is given by the following Formula (1):

[Formula 2]

$$T_s^{-1} = \begin{bmatrix} 1 & 0 & l_{ls} & 0 \\ 0 & 1 & 0 & -l_{ls} \\ 1 & 0 & l_{rs} & 0 \\ 0 & 1 & 0 & -l_{rs} \end{bmatrix} \quad (1)$$

where:

$l_{ls}$ is the Z-axis coordinate of the center of the first axial position sensors 4b; and $l_{rs}$ is the Z-axis coordinate of the center of the second axial position sensors 5b.

Furthermore, as shown in FIG. 2, the signals $f_x$, $f_y$, $τ_y$, and $τ_x$ are inputted to the second signal converter 22. And the second signal converter 22 performs LB 1 signal conversion upon the inputted signals, and outputs the result of signal conversion of the input signal $f_x$ to the third summation point 30, outputs the result of signal conversion of the input signal $f_y$ to the fourth summation point 31, outputs the result of signal conversion of the input signal $τ_y$ to the fifth summation point 32, and outputs the result of signal conversion of the input signal $τ_x$ to the sixth summation point 33, and moreover outputs each of these as a minus signal. Here $L_B$ is given by the following Equation (2):

[Formula 3]

$$L_B = \begin{bmatrix} 1 & 0 & 1 & 0 \\ 0 & 1 & 0 & 1 \\ l_{lb} & 0 & l_{rb} & 0 \\ 0 & -l_{lb} & 0 & -l_{rb} \end{bmatrix} \quad (2)$$

where:

$l_{lb}$ is the Z-axis coordinate of the center of the first electromagnets 4a; and $l_{rb}$ is the Z-axis coordinate of the center of the second electromagnets 5a.

The first translatory motion controller 23 and the second translatory motion controller 24 are both built to execute PID control. The first translatory motion controller 23 and the second translatory motion controller 24 are interposed between the first signal converter 21 and the second signal converter 22. The first translatory motion controller 23 is built so that the output signal x from the first signal converter 21 is inputted and the first translatory motion controller 23 outputs the signal $f_x$ to the second signal converter 22. On the other hand, the second translatory motion controller 23 is built so that the output signal y from the first signal converter 21 is inputted and the second translatory motion controller 23 outputs the signal $f_y$ to the second signal converter 22. And this first translatory motion controller 23 and this second translatory motion controller 24 together constitute a translatory motion control circuit.

Moreover, the first angular motion controller 25, the second angular motion controller 26, the first cross signal converter 27, and the second cross signal converter 28 are also interposed between the first signal converter 21 and the second signal converter 22. In concrete terms, the first angular motion controller 25 is arranged so as to receive input of the output signal $θ_y$ of the first signal converter 21 and so as to output an output signal to the seventh summation point 35, and the second angular motion controller 26 is arranged so as to receive input of the output signal $θ_x$ of the first signal converter 21 and so as to output an output signal to the eighth summation point 36. Moreover, a fifth branch point 38 is provided upon the fifth signal line 37 for the output signal $θ_y$ of the first signal controller 21, and a seventh branch point 40 is provided upon the seventh signal line 39 for the output signal $θ_x$ of the first signal converter 21.

Each of the angular motion controllers 25 and 26 is adapted to perform $PID_A$ control. This $PID_A$ control is given by a transmission function like the following Formula (3). Here $K_P$ and $K_D$ are:

$K_P$: the proportional control coefficient; and $K_D$: the differential control coefficient

[Formula 4]

$$PID_A = K_P + K_D s \quad (3)$$

Furthermore, the first cross signal converter 27 is disposed between the fifth branch point 38 and the eighth summation point 36. The output signal $θ_y$ of the first signal converter 21 is inputted to the first cross signal converter 27 via the fifth branch point 38, and the first cross signal converter 27 converts this inputted signal and outputs it as a minus signal to the eighth summation point 36. As a result, the output signal of the first cross signal converter 27 is subtracted from the output signal of the second angular motion controller 26 at the eighth summation point 36. On the other hand, the second cross signal converter 28 is disposed between the seventh branch point 40 and the seventh summation point 35. The output signal $θ_x$ of the first signal converter 21 is inputted to the second cross signal converter 28 via the seventh branch point 40, and the second cross signal converter 28 converts this inputted signal and outputs it to the seventh summation point 35. As a result, the output signal of the second cross signal converter 28 is added to the output signal of the first angular motion controller 25 at the seventh summation point 35.

Each of the cross signal converters 27 and 28 performs conversion of the inputted signals using a coefficient Kc for cross feedback. Moreover, this coefficient Kc is given by the following Formula (4). Here:

$I_d$: moment of inertia around diameter passing through barycenter of rotating body 2
$I_P$: moment of inertia around axis Ax
$\Omega$: rotational speed of rotating body 2

[Formula 5]

$$K_c = \frac{I_P \Omega K_D}{2 I_d} \quad (4)$$

The first angular motion controller 25, the second angular motion controller 26, the first cross signal converter 27, and the second cross signal converter 28 together constitute a angular motion control circuit 45.

Moreover, a first branch point 48 is provided in the first signal line 47 for the input signal x1 to the first signal converter 21, a second branch point 50 is provided in the second signal line 49 for the input signal y1, a third branch point 52 is provided in the third signal line 51 for the input signal x2, and a fourth branch point 54 is provided in the fourth signal line 53 for the input signal y2.

The negative bearing stiffness elimination circuit 12 is interposed between the summation points 30, 31, 32, and 33 where the signals from the second signal converter 22 are outputted, and the branch points 48, 50, 52, and 54 at which the signals to the first signal converter 21 are branched off. Due to this, the input signals x1, y1, x2, and y2 are inputted to the negative bearing stiffness elimination circuit 12 via the branch points 48, 50, 52, and 54. And the negative bearing stiffness elimination circuit 12 is connected via multipliers 55, 56, 57, and 58 which serve as coefficient multiplication device, so as to output signals related to negative bearing stiffness to the summation points 30, 31, 32, and 33. In concrete terms, the negative bearing stiffness elimination circuit 12 is disposed so as respectively: to output the output signal corresponding to the input signal x1 via the first multiplier 55 to the third summation point 30; to output the output signal corresponding to the input signal y1 via the second multiplier 56 to the fourth summation point 31; to output the output signal corresponding to the input signal x2 via the third multiplier 57 to the fifth summation point 32; and to output the output signal corresponding to the input signal y2 via the fourth multiplier 58 to the sixth summation point 33.

The transmission function of the negative bearing stiffness elimination circuit 12 is $K_M L_B^T T_S$. Here, $K_M$ is given by the following Formula (5):

[Formula 6]

$$K_M = \begin{bmatrix} K_{Ml} & 0 & 0 & 0 \\ 0 & K_{Ml} & 0 & 0 \\ 0 & 0 & K_{Mr} & 0 \\ 0 & 0 & 0 & K_{Mr} \end{bmatrix} \quad (5)$$

Moreover, the eight-pole heteropolar type case is given by the following Equation (6).
Here:
$\mu_0$: magnetic permeability of the vacuum
$S_i$: magnetic pole cross sectional area
$N_i$: number of coil turns
$I_i$: bias current
$\delta_i$: radial clearance Incidentally, it should be understood that the symbol "i" in "$S_i$", "$I_i$" and so on means including both the first electromagnets 4a and the second electromagnets 5a.

[Formula 7]

$$K_{Mi} = \cos(\pi/8) \mu_0 S_i \frac{(N_i I_i)^2}{\delta_i^3}, \ (i = l, r) \quad (6)$$

Incidentally, it should be understood that, in Formulas (5) and (6), the symbol "l" denotes the first electromagnets 4a, and the symbol "r" denotes the second electromagnets 5a.

Moreover, $L_B^T$ is the transposed matrix of $L_B$ of Formula (2) described above, and $T_S$ corresponds to the inverse matrix $T_S^{-1}$ of Formula (1) described above.

The signal outputted from the negative bearing stiffness elimination circuit 12 via the first multiplier 55 is subtracted at the third summation point 30 from the minus output signal of the second signal converter 22. In a similar manner, respectively: the signal outputted from the negative bearing stiffness elimination circuit 12 via the second multiplier 56 is subtracted at the fourth summation point 31 from the minus output signal of the second signal converter 22; the signal outputted from the negative bearing stiffness elimination circuit 12 via the third multiplier 57 is subtracted at the fifth summation point 32 from the minus output signal of the second signal converter 22; and the signal outputted from the negative bearing stiffness elimination circuit 12 via the fourth multiplier 58 is subtracted at the sixth summation point 33 from the minus output signal of the second signal converter 22.

The results of subtraction at the summation points 30, 31, 32, and 33 are converted to current values by the converters 61, 62, 63, and 64 which serve as current value command device, by using conversion coefficients $k_E$ for converting the force values into current values. In concrete terms, the signal $f_{x1}$ outputted from the third summation point 30 as its subtraction result is inputted to the first converter 61 which is shown in the figure as its conversion coefficient $1/k_m$. In a similar manner, respectively: the signal $f_{y1}$ outputted from the fourth summation point 31 as its subtraction result is inputted to the second converter 62 which is shown in the figure as its conversion coefficient $1/k_{El}$; the signal $f_{x2}$ outputted from the fifth summation point 32 as its subtraction result is inputted to the third converter 63 which is shown in the figure as its conversion coefficient $1/k_{Er}$; and the signal $f_{y2}$ outputted from the sixth summation point 33 as its subtraction result is inputted to the fourth converter 64 which is shown in the figure as its conversion coefficient $1/k_{Er}$. And these inputted signals are converted and outputted by the converters 61, 62, 63, and 64 into current values, using the conversion coefficients $1/k_{El}$ and $1/k_{Er}$. Moreover, these current values that are outputted from the converters 61, 62, 63, and 64 are employed for controlling the electromagnets 4a and 5a of the radial magnetic bearings 4 and 5. Incidentally, it should be understood that $k_{El}$ indicates the conversion coefficient that is used for the first electromagnets 4a, while $k_{Er}$ indicates the coefficient that is used for the second electromagnets 5a.

Moreover, a ninth branch point 66 is provided upon the ninth signal line 65 for the output signal of the first converter 61, a tenth branch point 68 is provided upon the tenth signal line 67 for the output signal of the second converter 62, an eleventh branch point 70 is provided upon the eleventh signal line 69 for the output signal of the third converter 63, and a twelfth branch point 72 is provided upon the twelfth signal line 71 for the output signal of the fourth converter 64.

The current values outputted from the converters 61, 62, 63, and 64 are inputted via the branch points 66, 68, 70, and 72 to the low pass filters 76, 77, 78, and 79, which serve as DC component extraction device. In concrete terms, the current value outputted by the first converter 61 is inputted from the ninth branch point 66 to the first low pass filter 76, the current value outputted by the second converter 62 is inputted from the tenth branch point 68 to the second low pass filter 77, the current value outputted by the third converter 63 is inputted from the eleventh branch point 70 to the third low pass filter 78, and the current value outputted by the fourth converter 64 is inputted from the twelfth branch point 72 to the fourth low pass filter 79.

Filters whose cutoff frequency is 1 Hz or less are used for all of the low pass filters 76, 77, 78, and 79. Due to this, all of the low pass filters 76, 77, 78, and 79 are configured so as to intercept frequencies greater than 1 Hz from the current values outputted by the converters 61, 62, 63, and 64, and to output signals the extracted DC (direct-current) components $i_{dc}$.

Moreover, the signals outputted by the low pass filters 76, 77, 78, and 79 are inputted to calculation devices 81, 82, 83, and 84 which serve as correction coefficient calculation device. In concrete terms, respectively, the output signal of the first low pass filter 76 is inputted to the first calculation device 81, the output signal of the second low pass filter 77 is inputted to the second calculation device 82, the output signal of the third low pass filter 78 is inputted to the third calculation device 83, and the output signal of the fourth low pass filter 79 is inputted to the fourth calculation device 84. A correction coefficient C is calculated by each of these calculation devices 81, 82, 83, and 84 on the basis of the DC component $i_{dc}$. The function utilized by each of the calculation devices 81, 82, 83, and 84 for calculating the correction coefficient C is given by the following Formulas (7) and (8). Here I0 is the bias current (without distinguishing between the electromagnets 4a and 5a).

[Formula 8]

$$C = \begin{cases} 1 + \left(\dfrac{|i_{dc}|}{I_0}\right)^2 & \text{if } i_{dc} \leq I_0, \quad (7) \\ 1 + \dfrac{|i_{dc}|}{I_0} & \text{if } i_{dc} > I_0. \quad (8) \end{cases}$$

Figure 3:
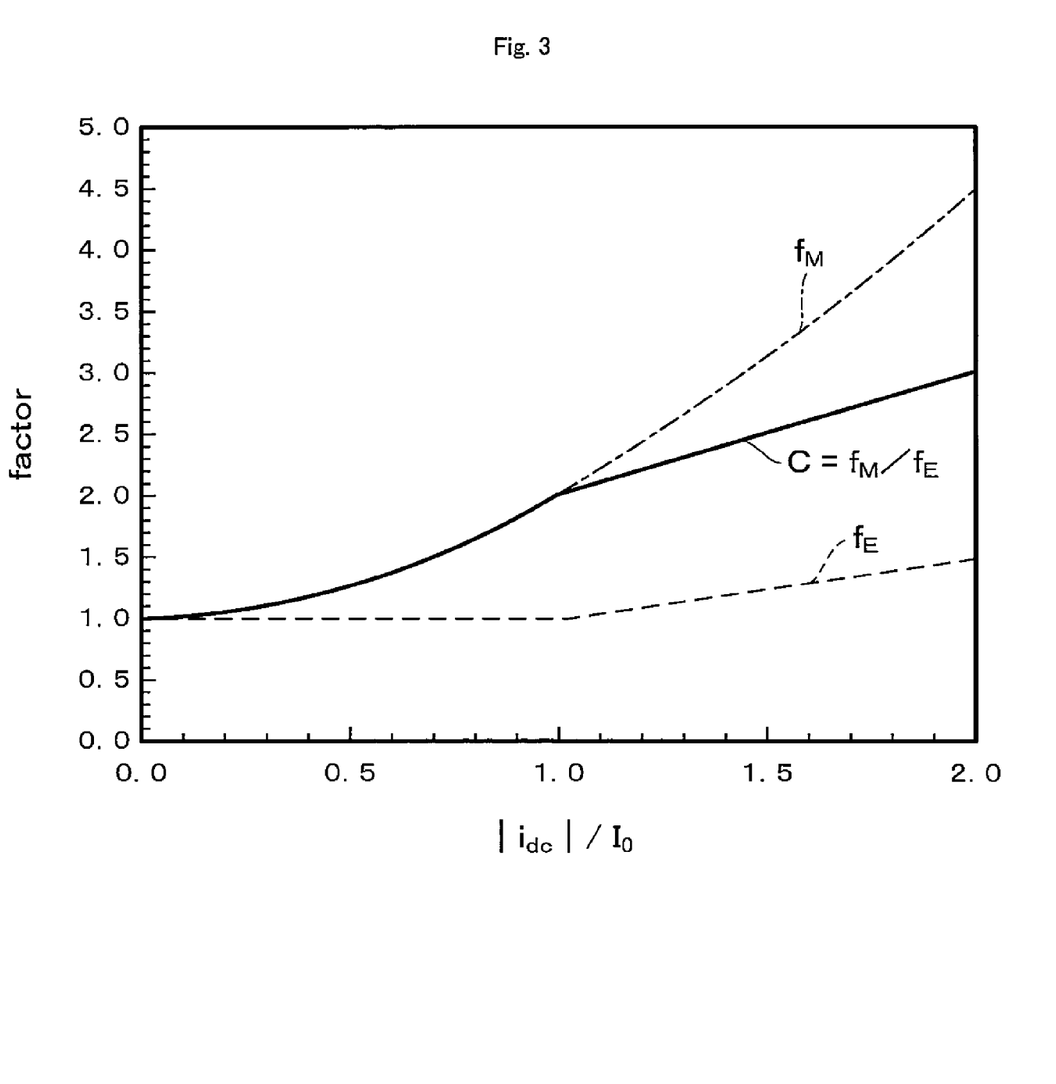
FIG. 3 is a figure showing a relationship between change of the negative bearing stiffness, change of the control rigidity, and a correction coefficient that is used by a negative bearing stiffness elimination circuit for multiplication.

Here, Formulas (7) and (8) are obtained from the change of negative bearing stiffness and from the change of control rigidity. FIG. 3 is a figure showing a relationship between the change of negative bearing stiffness, the change of control rigidity, and the correction coefficient C that is used by the negative bearing stiffness elimination circuit 12 for multiplication. The horizontal axis in FIG. 3 shows the absolute value of the DC component $i_{dc}$ divided by the bias current I0 (i.e. $|i_{dc}|/I_0$), while the vertical axis shows the coefficient value.

In FIG. 3, $f_M$ is shown by the single dotted broken line, $f_E$ is shown by the broken line, and the correction coefficient C is shown by the solid line. Moreover, the following are the meanings of $f_M$ and $f_E$:
$f_M$: the relative change of negative bearing stiffness when a case without steady load ($i_{dc}$=0) is used as a reference
$f_E$: the relative change of control rigidity when a case without steady load ($i_{dc}$=0) is used as a reference As shown in FIG. 3, $f_M$ gives the quadratic functional change from the position corresponding to the coefficient 1, while $f_E$ is constant and remains at unity from the position corresponding to the coefficient 1 up to the position where the value of $|i_{dc}|/I_0$ corresponds to 1, and gives proportional functional change when the value of $|i_{dc}|/I_0$ is greater than 1. On the other hand, the correction coefficient C is obtained by dividing $f_M$ by $f_E$ (i.e. is equal to $f_M/f_E$). Due to this, the value of the correction coefficient C changes in a similar manner to $f_M$ when the value of $|i_{dc}|/I0$ is less than or equal to 1 (i.e. when idc≤I0); in other words, gives the quadratic functional change (corresponding to Formula (7)), while it gives the proportional functional change (corresponding to Formula (8)) when the value of $|i_{dc}|/I_0$ is greater than 1 (i.e. when $i_{dc}$>$I_0$). And the function that describes the change of the value of the correction coefficient C shown in FIG. 3 corresponds to Formulas (7) and (8). The DC components $i_{dc}$ are extracted by the filters 76, 77, 78, and 79 for each of the X-axis and the Y-axis of the electromagnets 4a and 5a, and, on the basis of these extracted DC components $i_{dc}$, the correction coefficients C are also calculated for each of the X-axis and the Y-axis of the electromagnets 4a and 5a.

Returning to FIG. 2, the calculation result from the first calculation device 81 is outputted to the first multiplier 55, the calculation result from the second calculation device 82 is outputted to the second multiplier 56, the calculation result from the third calculation device 83 is outputted to the third multiplier 57, and the calculation result from the fourth calculation device 84 is outputted to the fourth multiplier 58. In each of these multipliers 55, 56, 57, and 58, the output signal from the negative bearing stiffness elimination circuit 21 and the correction coefficient C obtained by each calculation device are multiplied together. And, respectively: the multiplication result from the first multiplier 55 is outputted to the third summation point 30; the multiplication result from the second multiplier 56 is outputted to the fourth summation point 31; the multiplication result from the third multiplier 57 is outputted to the fifth summation point 32; and the multiplication result from the fourth multiplier 58 is outputted to the sixth summation point 33. Due to this, at each of the summation points 30, 31, 32, and 33, the signals that have been multiplied by the multipliers 55, 56, 57, and 58 are employed in subtraction of the output signals from the second signal converter 22.

As has been explained above, according to the magnetic bearing apparatus 1 of this embodiment, negative bearing stiffness that can occur between the electromagnets 4a and 5a and the rotating body 2 is given consideration by the negative bearing stiffness elimination circuit 12. Moreover, the output signal from the negative bearing stiffness elimination circuit 12 is multiplied by the correction coefficient C that is calculated according to the DC component $i_{dc}$. As shown in FIG. 3, the DC component $i_{dc}$ exerts an influence upon the negative bearing stiffness and upon the control rigidity. In other words, the correction coefficient according to changes of the negative bearing stiffness and the control rigidity, is fed back to the output signal of the negative bearing stiffness elimination circuit 12. Since due to this it becomes possible to eliminate the negative bearing stiffness according to attitudes, such as the a mounting attitude in which the axis Ax becomes horizontal, or a mounting attitude in which the axis Ax becomes vertical, accordingly the mounting attitude is not limited. In other words, since it is possible to control the electromagnets 4a and 5a according to change of the negative bearing stiffness and change of the control rigidity, accordingly it is possible to implement levitation control of the rotating body 2 to correspond to various different types of mounting attitude, in which the negative bearing stiffness changes. Furthermore, for example, the magnetic bearing apparatus 1 corresponding to the attitude in which the axis Ax becomes horizontal or vertical, can suppress instability and the like of levitation control arising due to the bearing being mounted in an opposite attitude.

A Second Embodiment of the Radial Direction Controller

Figure 4:
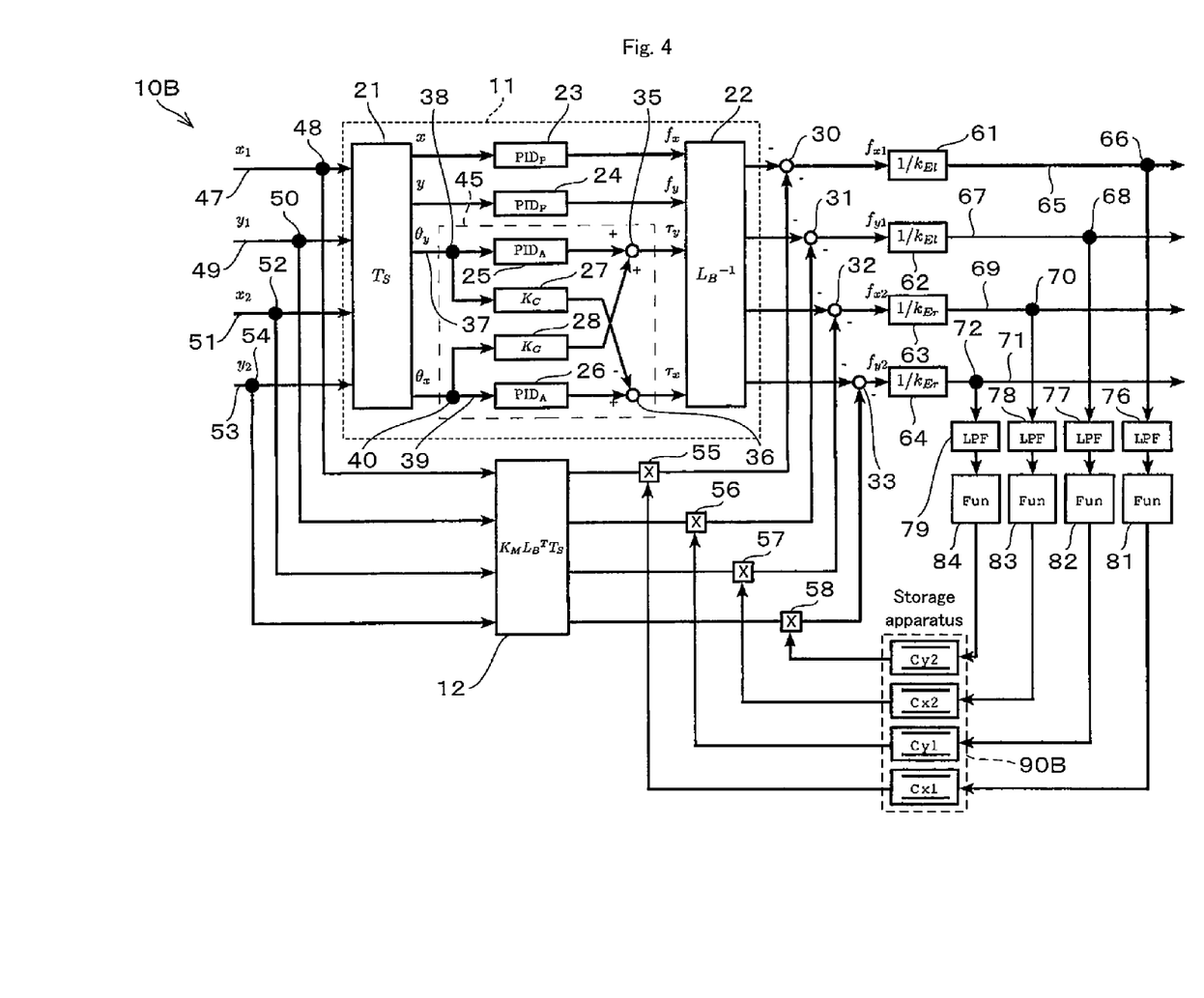
FIG. 4 is a figure showing an example of a block diagram of a signal system of a radial direction controller according to a second embodiment.

Next, a second embodiment of the radial direction controller 10 will be explained with reference to FIG. 4. In the following, to structures that are common with the first embodiment, the same reference symbols will be appended in FIG. 4, and explanation thereof will be omitted. FIG. 4 is a figure showing an example of a block diagram of a signal system of a radial direction controller 10B according to the second embodiment. As shown in FIG. 4, in this radial direction controller 10B of the second embodiment, a rewritable storage apparatus 90B is provided between the calculation devices 81, 82, 83, and 84 and the multipliers 55, 56, 57, and 58.

The storage apparatus 90B stores the correction coefficient $C_{x1}$ outputted from the first calculation device 81, the correction coefficient $C_{y1}$ outputted from the second calculation device 82, the correction coefficient $C_{x2}$ outputted from the third calculation device 83, and the correction coefficient $C_{y2}$ outputted from the fourth calculation device 84. And, respectively, the stored correction coefficient $C_{x1}$ is utilized by the first multiplier 55, the stored correction coefficient $C_{y1}$ is utilized by the second multiplier 56, the stored correction coefficient $C_{x2}$ is utilized by the third multiplier 57, and the stored correction coefficient $C_{y2}$ is utilized by the fourth multiplier 58; and each of them is utilized for multiplication of the respective output signal from the negative bearing stiffness elimination circuit 12. In this manner, the radial direction controller 10B according to the second embodiment is built so that the correction coefficients $C_{y2}$, $C_{x2}$, $C_{y1}$, and $C_{x1}$ that have been calculated according to change of the negative bearing stiffness and according to the change of control rigidity are stored in the storage apparatus 90B, and feedback to the output signals of the negative bearing stiffness elimination circuit 12 is performed via the storage apparatus 90B.

A Third Embodiment of the Radial Direction Controller

Figure 5:
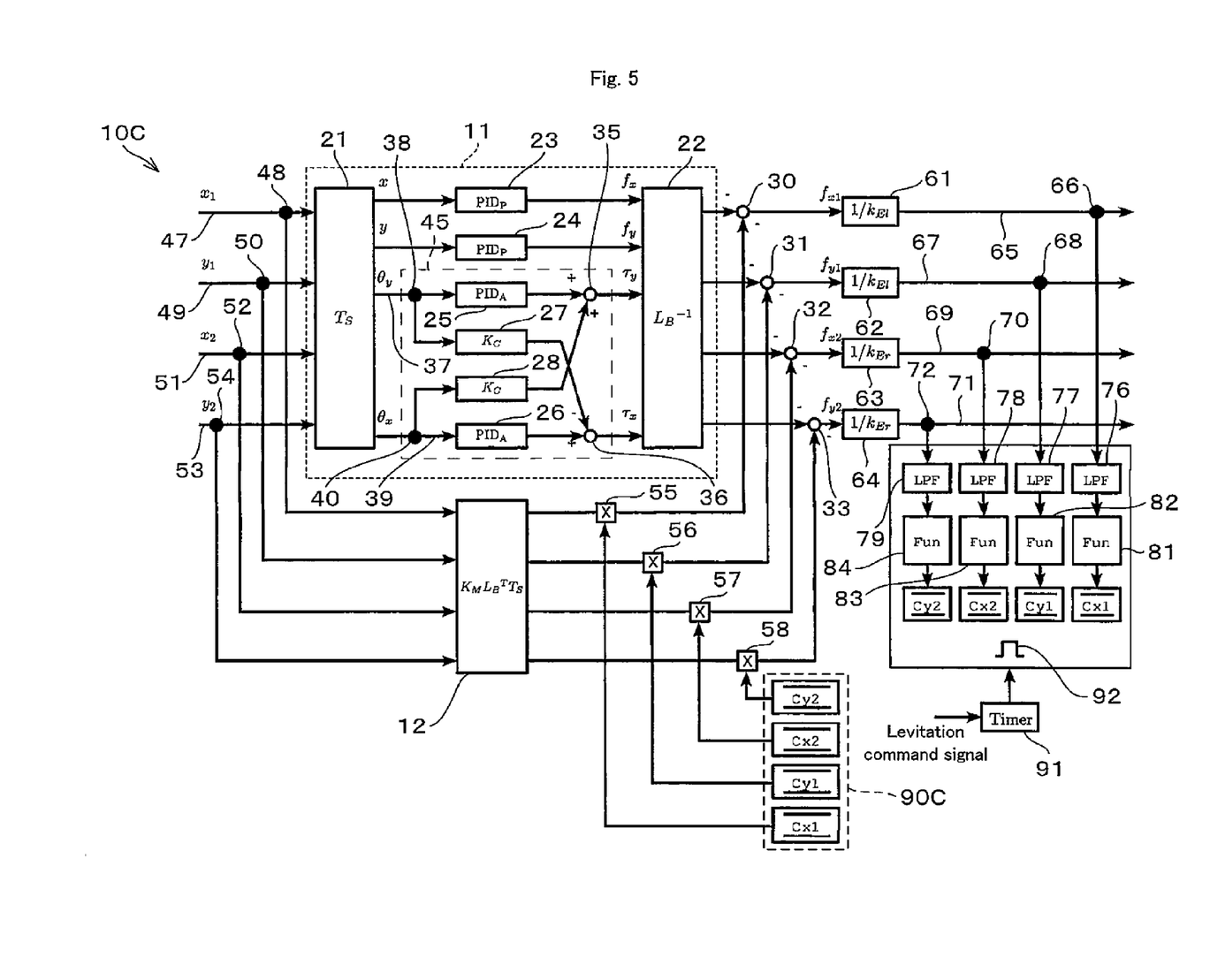
FIG. 5 is a figure showing an example of a block diagram of a signal system of a radial direction controller according to a third embodiment.

Next, a third embodiment of the radial direction controller 10 will be explained with reference to FIG. 5. In the following, to structures that are common with the first embodiment, the same reference symbols will be appended in FIG. 5, and explanation thereof will be omitted. FIG. 5 is a figure showing an example of a block diagram of a signal system of a radial direction controller 10C according to the third embodiment. As shown in FIG. 5, a storage apparatus 90C that stores the coefficients used by the multipliers 55, 56, 57, and 58, a timer apparatus 91, and an enabler 92 are provided to the radial direction controller 10C of this third embodiment.

The enabler 92 controls permission or non-permission of the extractions performed by the filters 76, 77, 78, and 79 and of the calculations executed by the calculation devices 81, 82, 83, and 84. In other words, unless permitted by the enabler 92, the filters 76, 77, 78, and 79 cannot extract the DC components $i_{dc}$, and the calculation devices 81, 82, 83, and 84 cannot perform calculation of the respective correction coefficients. And in other words, the correction coefficients $C_{y2}$, $C_{x2}$, $C_{y1}$, and $C_{x1}$ are not calculated until permitted by the enabler 92.

And the enabler 92 permits the extractions performed by the filters 76, 77, 78, and 79 and the calculations performed by the calculation devices 81, 82, 83, and 84, on the basis of the signal from the timer apparatus 91.

On the other hand, 1 is stored in the storage apparatus 90C as the initial values of the coefficients to be used by the multipliers 55, 56, 57, and 58. And this initial value of 1 is used by each of the multipliers 55, 56, 57, and 58 when the rotating body 2 starts the levitation. Moreover, when the levitation of the rotating body 2 is started, levitation command signal is inputted to the timer apparatus 91. About two seconds after this levitation command signal has been inputted, the timer apparatus 91 outputs a signal to the enabler 92 so as to permit extraction performed by the filters 76, 77, 78, and 79 and calculation performed by the calculation devices 81, 82, 83, and 84. Due to this, the radial direction controller 10C is configured so that the correction coefficients $C_{y2}$, $C_{x2}$, $C_{y1}$, and $C_{x1}$ are calculated after about two seconds from starting of the levitation of the rotating body 2. The correction coefficients $C_{y2}$, $C_{x2}$, $C_{y1}$, and $C_{x1}$ that have been calculated are outputted to the storage apparatus 90C, and are stored thereby. Moreover, the correction coefficients $C_{y2}$, $C_{x2}$, $C_{y1}$, and $C_{x1}$ that are stored in the storage apparatus 90C are also utilized by the multipliers 55, 56, 57, and 58. In this manner, the radial direction controller 10C according to the third embodiment is configured so that feedback of the output signals of the negative bearing stiffness elimination circuit 12 is not performed using the initial value of 1 at the starting time of the flotation of the rotating body 2, but so that feedback according to the change of negative bearing stiffness and the control rigidity against the output signals of the negative bearing stiffness elimination circuit 12 is performed only after a predetermined time period has elapsed from the time when flotation of the rotating body 2 has started. Moreover, the combination of the enabler 92 and the timer apparatus 91 functions as the "permission device" of the Claims.

A Fourth Embodiment of the Radial Direction Controller

Figure 6:
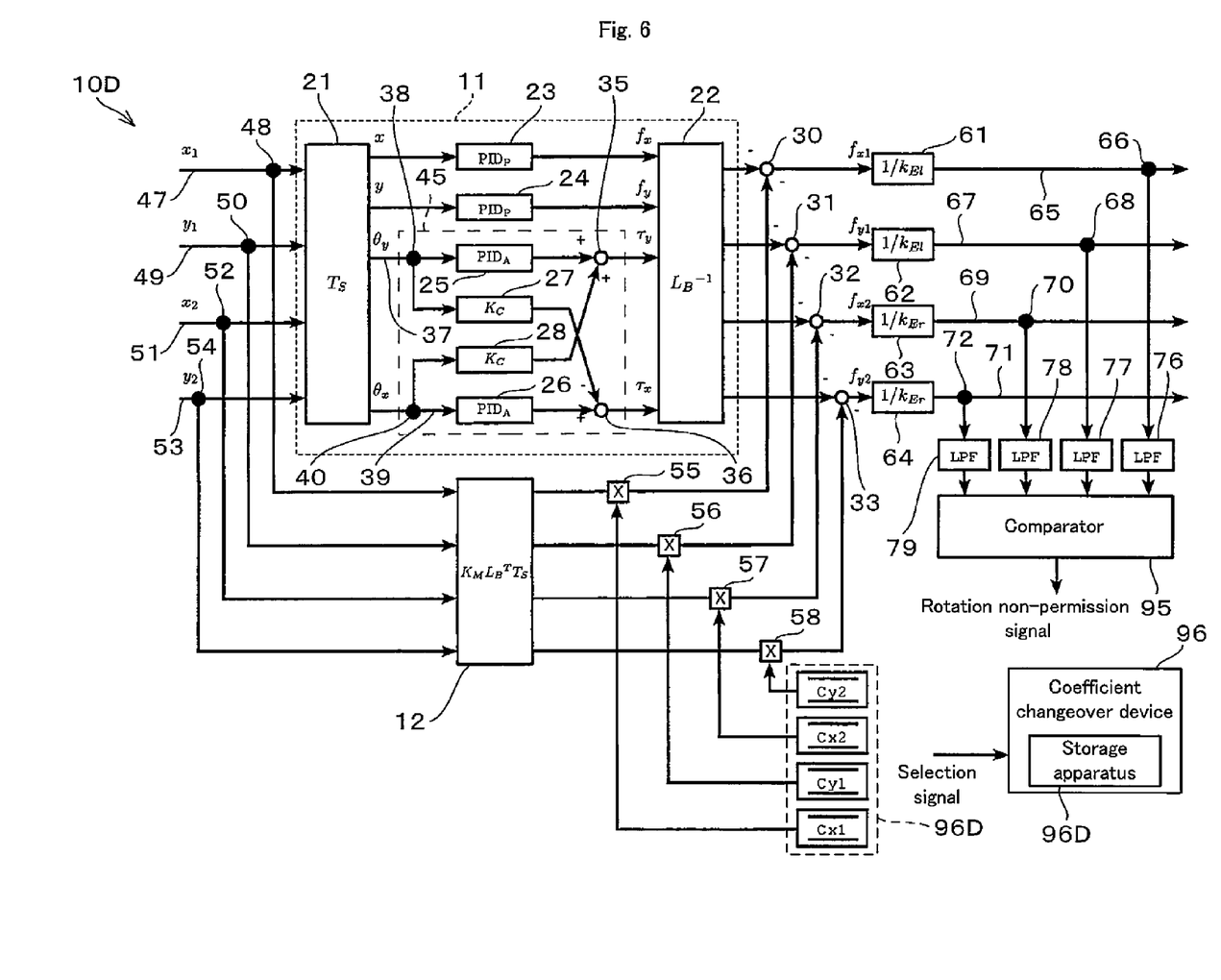
FIG. 6 is a figure showing an example of a block diagram of a signal system of a radial direction controller according to a fourth embodiment.

Next, a fourth embodiment of the radial direction controller 10 will be explained with reference to FIGS. 6 through 8. In the following, to structures that are common with the first embodiment, the same reference symbols will be appended in FIGS. 6 through 8, and explanation thereof will be omitted. FIG. 6 is a figure showing an example of a block diagram of a signal system of a radial direction controller 10D according to the fourth embodiment. As shown in FIG. 6, to the radial direction controller 10D of this fourth embodiment, there are provided a comparator 95 serving as a comparison device, and a coefficient changeover device 96 serving as a coefficient distinguishing device and as a reference value distinguishing device.

In the coefficient changeover device 96, there is provided a storage apparatus 96D serving as a specified coefficient storage device, a correction coefficient storage device, a component reference value storage device, and a specified reference value storage device. For each of the multipliers 55, 56, 57, and 58, in this storage apparatus 96D in advance, there are stored a plurality of correction coefficients and reference values for the DC components $i_{dc}$, corresponding respectively to a plurality of installation attitudes for the magnetic bearing apparatus 1, such as an attitude that roughly corresponds to the axis Ax extending in the horizontal direction and an attitude that roughly corresponds to the axis Ax extending in the vertical direction and so on. The reference values for each of the DC components $i_{dc}$ are values that are used by the comparator 95 for comparison with the DC components $i_{dc}$ outputted from the filters 76, 77, 78, and 79. This comparison performed by the comparator 95 between the DC components $i_{dc}$ and the reference values will be described hereinafter.

Figure 7A:
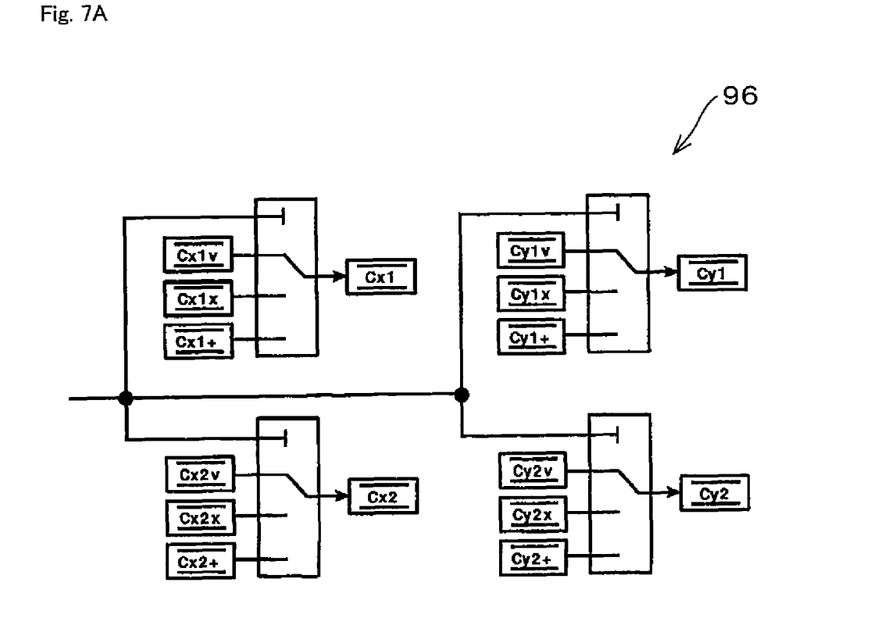
FIG. 7A is a figure showing an example of a block diagram of a signal system of a coefficient changeover device, and is a figure showing an example of a block diagram of a signal system related to changeover of a correction coefficient.
Figure 7B:
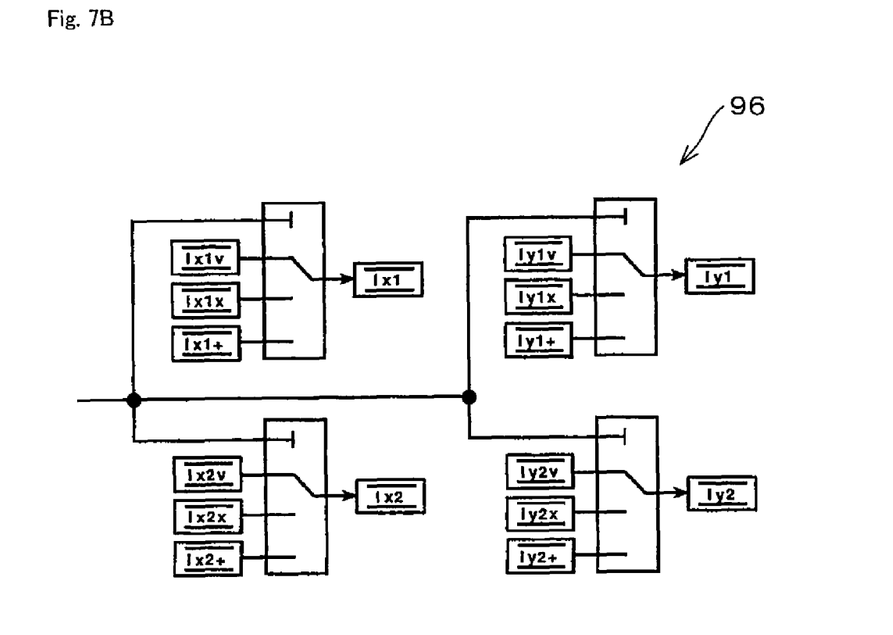
FIG. 7B is a figure showing an example of a block diagram of a signal system of a coefficient changeover device, and is a figure showing an example of a block diagram of a signal system related to a reference value for the DC component of a current value.
Figure 8:
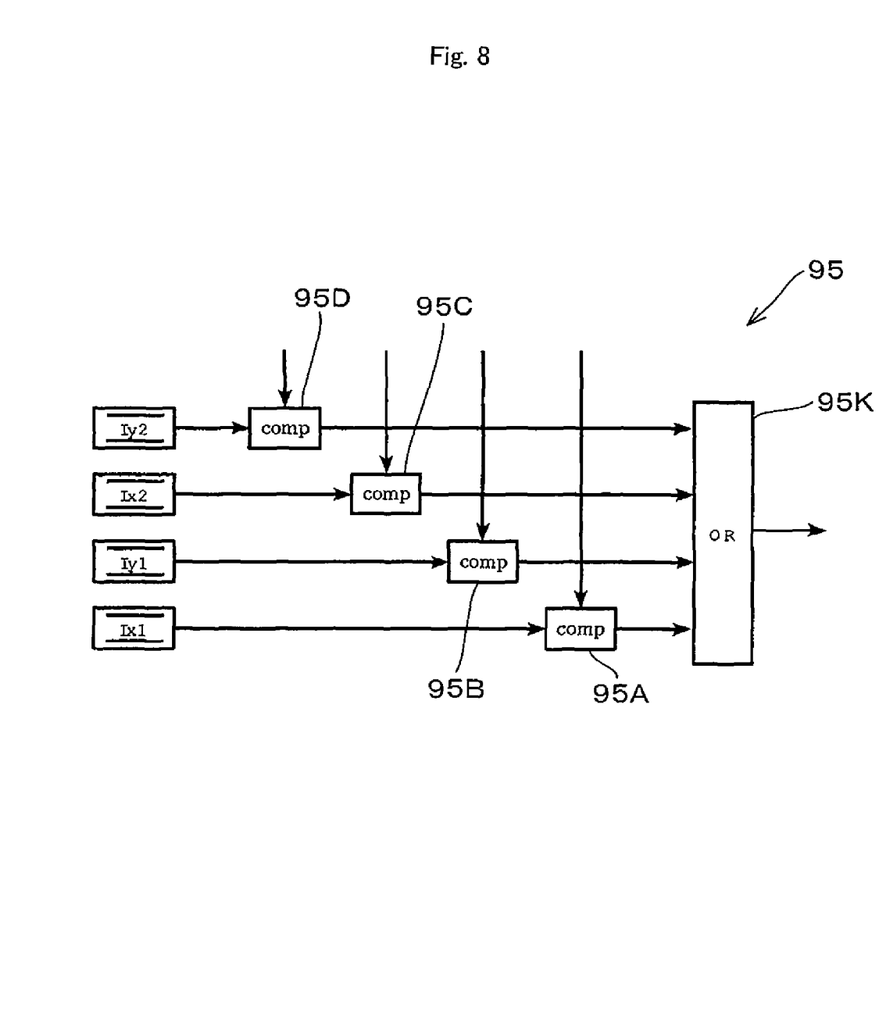
FIG. 8 is a figure showing an example of a block diagram of a signal system of a comparator.

Each of FIG. 7A and FIG. 7B is a figure showing an example of a block diagram of a signal system of the coefficient changeover device 96. Among these figures, FIG. 7A shows an example of a block diagram of a signal system related to changing over of the correction coefficients. The correction coefficients stored in the storage apparatus 96D are employed in the multiplications by the multipliers 55, 56, 57, and 58. A concrete explanation will now be given using the example of FIG. 7A. As shown in FIG. 7A, in this example, three correction coefficients are stored in the storage apparatus 96D for each of the displacements related to the X-axis and to the Y-axis of the radial position sensors 4b and 5b. And the coefficient changeover device 96 is used for specifying, from among these correction coefficients stored in the storage apparatus 96D, the correction coefficients that are to be used by the multipliers 55, 57, 57, and 58. In concrete terms, information is appended to the specified correction coefficients by the coefficient changeover device 96 in order to distinguish them from the other correction coefficients, and the correction coefficients to be utilized by the multipliers 55, 56, 57, and 58 are specified according to this appended information. Moreover, as one example, this specification is implemented by the installer who is installing the magnetic bearing apparatus 1 selecting the specified correction coefficients from among the plurality of correction coefficients, according to the installation attitude and so on of the magnetic bearing apparatus 10, and is changed over between the correction coefficients.

In the example of FIG. 7A, $C_{x1v}$, $C_{x1x}$, and $C_{x1+}$ are stored in the storage apparatus 96D as three correction coefficients that can be employed by the first multiplier 55; $C_{y1v}$, $C_{y1x}$, and $C_{y1+}$ are stored in the storage apparatus 96D as three correction coefficients that can be employed by the second multiplier 56; $C_{x2v}$, $C_{x2x}$, and $C_{x2+}$ are stored in the storage apparatus 96D as three correction coefficients that can be employed by the third multiplier 57; and $C_{y2v}$, $C_{y2x}$, and $C_{y2+}$ are stored in the storage apparatus 96D as three correction coefficients that can be employed by the fourth multiplier 58. And, as the specified correction coefficients $C_{x1}$, $C_{y1}$, $C_{x2}$, and $C_{y2}$ that are to be employed in the multiplications by the multipliers 55, 56, 57, and 58, one correction coefficient is specified for each of the multipliers 55, 56, 57, and 58. In concrete terms: $C_{x1v}$ is specified as the specified correction coefficient $C_{x1}$ that is to be employed in the multiplication by the first multiplier 55; $C_{y1v}$ is specified as the specified correction coefficient $C_{y1}$ that is to be employed in the multiplication by the second multiplier 56; $C_{x2v}$ is specified as the specified correction coefficient $C_{x2}$ that is to be employed in the multiplication by the third multiplier 57; and $C_{y2v}$ is specified as the specified correction coefficient $C_{y2}$ that is to be employed in the multiplication by the fourth multiplier 58.

Furthermore, the coefficient changeover device 96 is used for specifying among the reference values stored in the storage apparatus 96D, the reference values used by the comparator 95. In concrete terms, information for distinguishing the specified reference values from the other reference values is appended by the coefficient changeover device 96, and the correction coefficients to be used by the comparator 95 are specified according to this appended information. And FIG. 7B shows an example of a block diagram of a signal system related to the reference values for the DC components $i_{dc}$. As shown in FIG. 7B, in a similar manner to the correction coefficients, also with respect to the reference values for the DC components $i_{dc}$, three reference values are stored in the storage apparatus 96D for each of the displacements related to the X-axis and to the Y-axis of the radial position sensors 4b and 5b. In concrete terms, in the example of FIG. 7B: $I_{x1v}$, $I_{x1x}$, and $I_{x1+}$ are stored as the three reference values corresponding to the first low pass filter 76 in the storage apparatus 96D; $I_{y1v}$, $I_{y1x}$, and $I_{y1+}$ are stored as the three reference values corresponding to the second low pass filter 77 in the storage apparatus 96D; $I_{x2v}$, $I_{x2x}$, and $I_{x2+}$ are stored as the three reference values corresponding to the third low pass filter 78 in the storage apparatus 96D; and, $I_{y2v}$, $I_{y2x}$, and $I_{y2+}$ are stored as the three reference values corresponding to the fourth low pass filter 79 in the storage apparatus 96D. And, among the reference values for the DC components $i_{dc}$, $I_{x1v}$, $I_{y1v}$, $I_{x2v}$, and $I_{y2v}$ are specified to be employed as the specified reference values $I_{x1}$, $I_{y1}$, $I_{x2}$, and $I_{y2}$ that are to be the subjects of comparison by the comparator 95. Incidentally, it should be understood that, similarly to the case with the correction coefficients, it would also be acceptable for the specified reference values $I_{x1}$, $I_{y1}$, $I_{x2}$, and $I_{y2}$ to be changed over between the various reference values according to specification by the installation personnel. Moreover, the reference values of the DC components $i_{dc}$ may be stored in the storage apparatus 96D in respective correspondence with the correction coefficients, and the coefficient changeover device 96 may be configured so that also with respect to the reference values for the DC components $i_{dc}$, the reference values corresponding to the specified correction coefficients are specified as the specified reference values, by the specified correction coefficients being specified.

The comparator 95 is disposed as the destination for the outputs of the filters 76, 77, 78, and 79. FIG. 8 is a figure showing an example of a block diagram of a signal system of this comparator 95. The comparator 95 comprises a first comparison unit 95A, a second comparison unit 95B, a third comparison unit 95C, a fourth comparison unit 95D, and an OR circuit 95K. The first comparison unit 95A compares together the output signal of the first low pass filter 76 and the specified reference value $I_{x1}$; the second comparison unit 95B compares together the output signal of the second low pass filter 77 and the specified reference value $I_{y1}$; the third comparison unit 95C compares together the output signal of the third low pass filter 78 and the specified reference value $I_{x2}$; and the fourth comparison unit 95D compares together the output signal of the fourth low pass filter 79 and the specified reference value $I_{y2}$. And the comparison units 95A, 95B, 95C, and 95D output the results of their comparisons to the OR circuit 95K.

The OR circuit 95K outputs a rotation non-permission signal to the motor controller 9 which controls the rotation of the motor 3, if any one of the comparison units 95A, 95B, 95C, or 95D detects that the DC component $i_{dc}$ outputted from its one of the filters 76, 77, 78, or 79 is greater than its corresponding specified reference value $I_{x1}$, $I_{y1}$, $I_{x2}$, or $I_{y2}$. In this case, the motor controller 9 controls the motor 3 so as not to rotate the rotating body 2. In other words, if the rotation non-permission signal has been inputted from the comparator 95, the motor 3 does not start the rotation of the rotating body 2. In this manner, according to this fourth embodiment, appropriate correction coefficients corresponding to various attitudes of the magnetic bearing apparatus 1 are stored in the storage apparatus 96D, it is possible to change over to the appropriate ones of these correction coefficients, according to the attitude of the magnetic bearing apparatus 1. Due to this, it is possible to perform support of the rotating body in a more appropriate manner, according to the attitude of the magnetic bearing apparatus 1. On the other hand, by using the reference values $I_{x1}$, $I_{y1}$, $I_{x2}$, and $I_{y2}$ that correspond to the DC component $i_{dc}$, it is possible to perform control so that the rotating body 2 is not rotated. By doing this, it is possible to prevent the rotating body 2 from rotating if one of the DC components $i_{dc}$ exceeds its specified reference value $I_{x1}$, $I_{y1}$, $I_{x2}$, or $I_{y2}$, in other words if there is a possibility of the occurrence of instability or the like when the rotating body 2 is rotated, as for example when the installation attitude of the magnetic bearing apparatus 1 is outside the anticipated envelope.

The present invention is not to be considered as being limited to the embodiments described above; it may be implemented in any appropriate manner. While, in the embodiments described above, examples have been shown of formulas in which the calculation devices employ correction coefficients for calculation, the way in which this is done is not to be considered as particularly limited, provided that it is possible to calculate a coefficient that corresponds to the change of negative bearing stiffness. Moreover while, according to the third embodiment described above, the enabler 92 was a device that controls permission or non-permission both for the extraction executed by the filters 76, 77, 78, and 79 and for the calculation executed by the calculation devices 81, 82, 83, and 84, this is not to be construed as being limitative. For example, it would be possible for the enabler to be constructed to control only one or the other of these processes. Moreover while the radial direction controller 10C according to the third embodiment described above was built, using the timer apparatus 91 and the enabler 92, so that the correction coefficients were calculated after approximately two seconds elapse from the start of levitation of the rotating body 2, this type of operation is not to be considered as being limitative. For example, the initial values and the correction coefficients are stored in the storage device 90C in separate locations, and the multipliers may be configured so as to use the initial values when levitation is started, while using the calculated correction coefficients after a predetermined time period has elapsed. Furthermore, provided that the predetermined time period at which usage of the calculated correction coefficients starts is a time period at which it can be decided that the rotating body 2 is in a stable levitation state, then there is no limitation to it being after approximately two seconds has elapsed from the start of levitation of the rotating body 2.

Moreover, while the radial direction controller 10D according to the fourth embodiment described above is built so that it is considered that the predetermined condition is satisfied and the comparator 95 outputs a rotation non-permission signal if any one of the DC components $i_{dc}$ outputted from the filters 76, 77, 78, and 79 is greater than the corresponding reference value $I_{x1}$, $I_{y1}$, $I_{x2}$, or $I_{y2}$, this mode of operation is not to be considered as being limitative. For example, the comparator may be built so as to consider that the predetermined condition is satisfied and so as to output a rotation non-permission signal, if all of the DC components $i_{dc}$ outputted from the filters 76, 77, 78, and 79 are greater than the corresponding reference values $I_{x1}$, $I_{y1}$, $I_{x2}$, and $I_{y2}$.

Moreover, for example, it would also be possible to omit the filters 76, 77, 78, and 79 and the comparator 95 from the radial direction controller 10D according to the fourth embodiment described above. In this case, the storage apparatus 96D may do not function as a component reference value storage apparatus or as a specified reference value storage apparatus.

What is claimed is:

1. A radial direction controller that is applied to a magnetic bearing apparatus that supports a rotating body to be levitated by at least an electromagnet, comprising:

a radial control circuit that controls the displacement of the axis of the rotating body in the radial direction;

a negative bearing stiffness elimination circuit that is connected in parallel with the radial control circuit, and that outputs a signal related to negative bearing stiffness;

a current value command device that outputs a current value for controlling the electromagnet, on the basis of a signal outputted by the radial control circuit and the signal related to the negative bearing stiffness outputted by the negative bearing stiffness elimination circuit;

a DC component extraction device that extracts a DC component from the current value outputted by the current value command device;

a correction coefficient calculation device that calculates a correction coefficient on the basis of the DC component extracted by the DC component extraction device and a bias current for the electromagnet; and a coefficient multiplication device that multiplies the signal outputted by the negative bearing stiffness elimination circuit by the correction coefficient calculated by the correction coefficient calculation device.

2. The radial direction controller according to claim 1, wherein the correction coefficient calculation device calculates the correction coefficient by using the following formula:

$$C = \begin{cases} 1 + \left(\dfrac{|i_{dc}|}{I_0}\right)^2 & \text{if } i_{dc} \leq I_0, \\ 1 + \dfrac{|i_{dc}|}{I_0} & \text{if } i_{dc} > I_0, \end{cases}$$

where $i_{dc}$ represents the DC component, $I_0$ represents the bias current, and C represents the correction coefficient.

3. The radial direction controller according to claim 1, further comprising a storage apparatus that stores the correction coefficient calculated by the correction coefficient calculation device; and wherein
   the coefficient multiplication device performs the multiplication using the correction coefficient stored by the storage device.

4. The radial direction controller according to claim 3, wherein: the storage device stores an initial value of the correction coefficient; and
   the coefficient multiplication device, in the multiplication, uses the initial value stored by the storage device at starting time of levitation of the rotating body, and uses the correction coefficient calculated by the correction coefficient calculation device after a predetermined time period has elapsed from the starting time of the levitation of the rotating body.

5. The radial direction controller according to claim 4, further comprising a permission device that controls permission or non-permission of at least one of the extraction performed by the DC component extraction device, and the calculation performed by the correction coefficient calculation device, and wherein:
   the permission device controls the extraction performed by the DC component extraction device and the calculation performed by the correction coefficient calculation device to be not permitted from the starting time of the levitation of the rotating body until a predetermined time period has elapsed, and to be permitted after the predetermined time period has elapsed; and
   the coefficient multiplication device, after the extraction performed by the DC component extraction device and the calculation performed by the correction coefficient calculation device have been permitted by the permission device, implements utilization of the correction coefficient calculated by the correction coefficient calculation device after the predetermined time period has elapsed from the starting time of the levitation of the rotating body by using the correction coefficient calculated by the correction coefficient calculation device and stored by the storage device.

6. A radial direction controller that is applied to a magnetic bearing apparatus that supports a rotating body to be levitated by at least an electromagnet, comprising:
a radial control circuit that controls the displacement of the axis of the rotating body in the radial direction;
a negative bearing stiffness elimination circuit that is connected in parallel with the radial control circuit, and that outputs a signal related to negative bearing stiffness;
a current value command device that outputs a current value for controlling the electromagnet, on the basis of a signal outputted by the radial control circuit and the signal related to the negative bearing stiffness outputted by the negative bearing stiffness elimination circuit;
a correction coefficient storage device that stores a plurality of correction coefficients, each corresponding to an installation attitude of the axis of the rotating body;
a coefficient distinguishing device that appends information to a specified correction coefficient among the plurality of correction coefficients each corresponding to an installation attitude of the axis of the rotating body, for distinguishing the specified correction coefficient from other correction coefficients;
a specified coefficient storage device that stores the specified correction coefficient; and
a coefficient multiplication device that multiplies the signal outputted by the negative bearing stiffness elimination circuit by the specified correction coefficient stored by the specified coefficient storage device.

7. The radial direction controller according to claim 6, further comprising:
a DC component extraction device that extracts a DC component from the current value outputted by the current value command device;
a component reference value storage device that stores reference values of a plurality of DC components each corresponding to an installation attitude of the axis of the rotating body;
a reference value distinguishing device that appends information to a specified reference value among the plurality of reference values, for distinguishing the specified reference value from other reference values;
a specified reference value storage device that stores the specified reference value; and
a comparison device that compares together the DC component extracted by the DC component extraction device and the specified reference value stored by the specified reference value storage device, and that, if a predetermined condition is satisfied, outputs a control signal so that rotation of the rotating body is not started.

8. The radial direction controller according to claim 7, wherein the comparison device outputs the control signal as the predetermined condition having been satisfied, if the result that the DC component extracted by the DC component extraction device is greater than the specified reference value is included in the result of comparison together of the DC component extracted by the DC component extraction device and the specified reference value.

9. The radial direction controller according to claim 1, wherein a low pass filter whose cutoff frequency is 1 Hz or less is used as the DC component extraction device.

10. The radial direction controller according to claim 2, wherein a low pass filter whose cutoff frequency is 1 Hz or less is used as the DC component extraction device.

11. The radial direction controller according to claim 3, wherein a low pass filter whose cutoff frequency is 1 Hz or less is used as the DC component extraction device.

12. The radial direction controller according to claim 4, wherein a low pass filter whose cutoff frequency is 1 Hz or less is used as the DC component extraction device.

13. The radial direction controller according to claim 5, wherein a low pass filter whose cutoff frequency is 1 Hz or less is used as the DC component extraction device.

14. The radial direction controller according to claim 7, wherein a low pass filter whose cutoff frequency is 1 Hz or less is used as the DC component extraction device.

15. The radial direction controller according to claim 8, wherein a low pass filter whose cutoff frequency is 1 Hz or less is used as the DC component extraction device.

16. A magnetic bearing apparatus, comprising the radial direction controller according to claim 1.

17. A magnetic bearing apparatus, comprising the radial direction controller according to claim 2.

18. A magnetic bearing apparatus, comprising the radial direction controller according to claim 3.

19. A magnetic bearing apparatus, comprising the radial direction controller according to claim 4.

20. A magnetic bearing apparatus, comprising the radial direction controller according to claim 5.

21. A magnetic bearing apparatus, comprising the radial direction controller according to claim 6.

22. A magnetic bearing apparatus, comprising the radial direction controller according to claim 7.

23. A magnetic bearing apparatus, comprising the radial direction controller according to claim 8.

24. A magnetic bearing apparatus, comprising the radial direction controller according to claim 9.

* * * * *